March 21, 1961 P. C. SHERBURNE ET AL 2,975,996
MOTOR DRIVEN POSITIONER
Filed July 13, 1959 7 Sheets-Sheet 1

INVENTORS
PHILIP C. SHERBURNE
ALFRED ZOLLINGER
BY David D. McKenney
ATTORNEY

March 21, 1961 P. C. SHERBURNE ET AL 2,975,996
MOTOR DRIVEN POSITIONER
Filed July 13, 1959 7 Sheets-Sheet 2

INVENTORS
PHILIP C. SHERBURNE
ALFRED ZOLLINGER
BY David D. McKenney
ATTORNEY

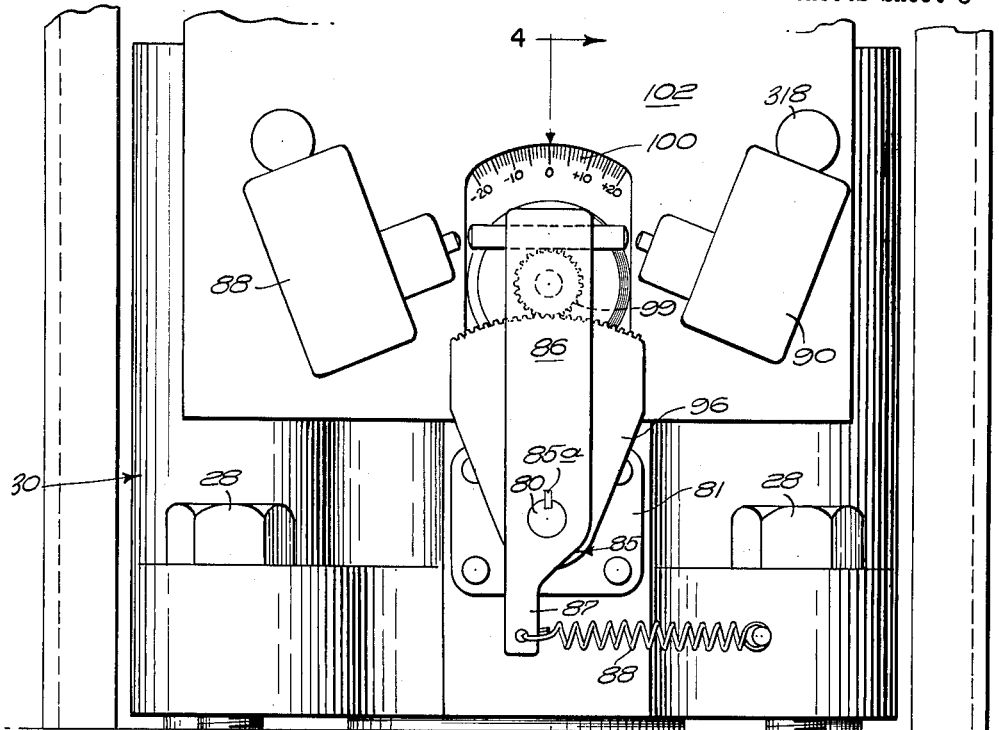
FIG. 3
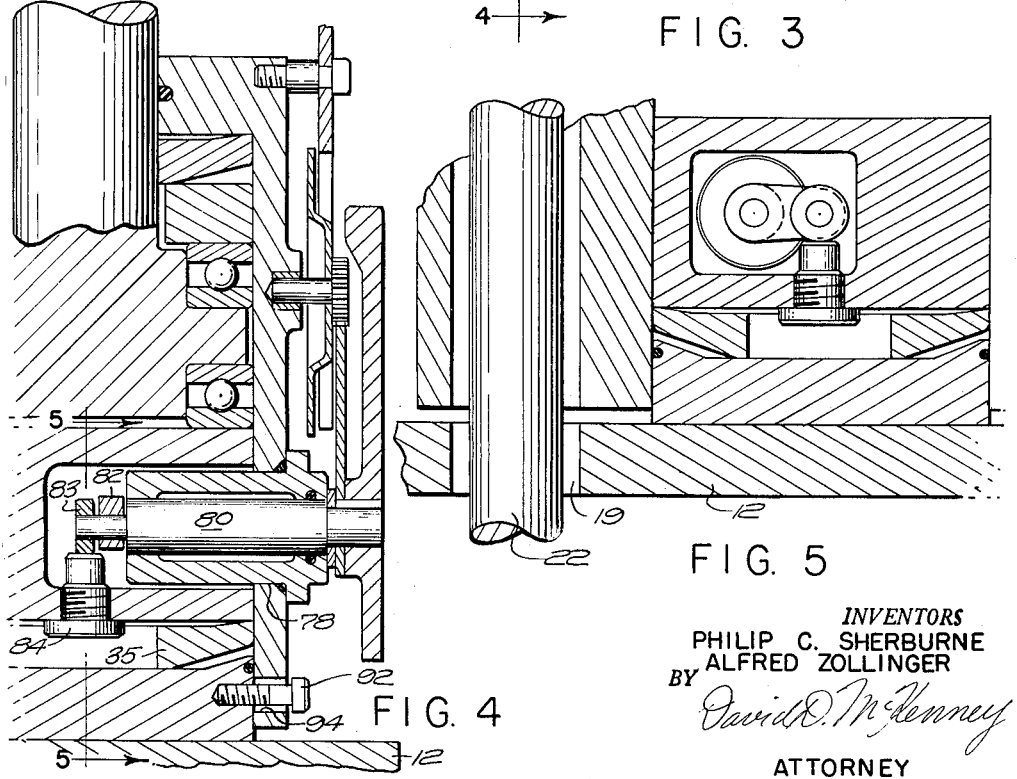
FIG. 4
FIG. 5
INVENTORS
PHILIP C. SHERBURNE
ALFRED ZOLLINGER
BY
*David D. McKenney*
ATTORNEY

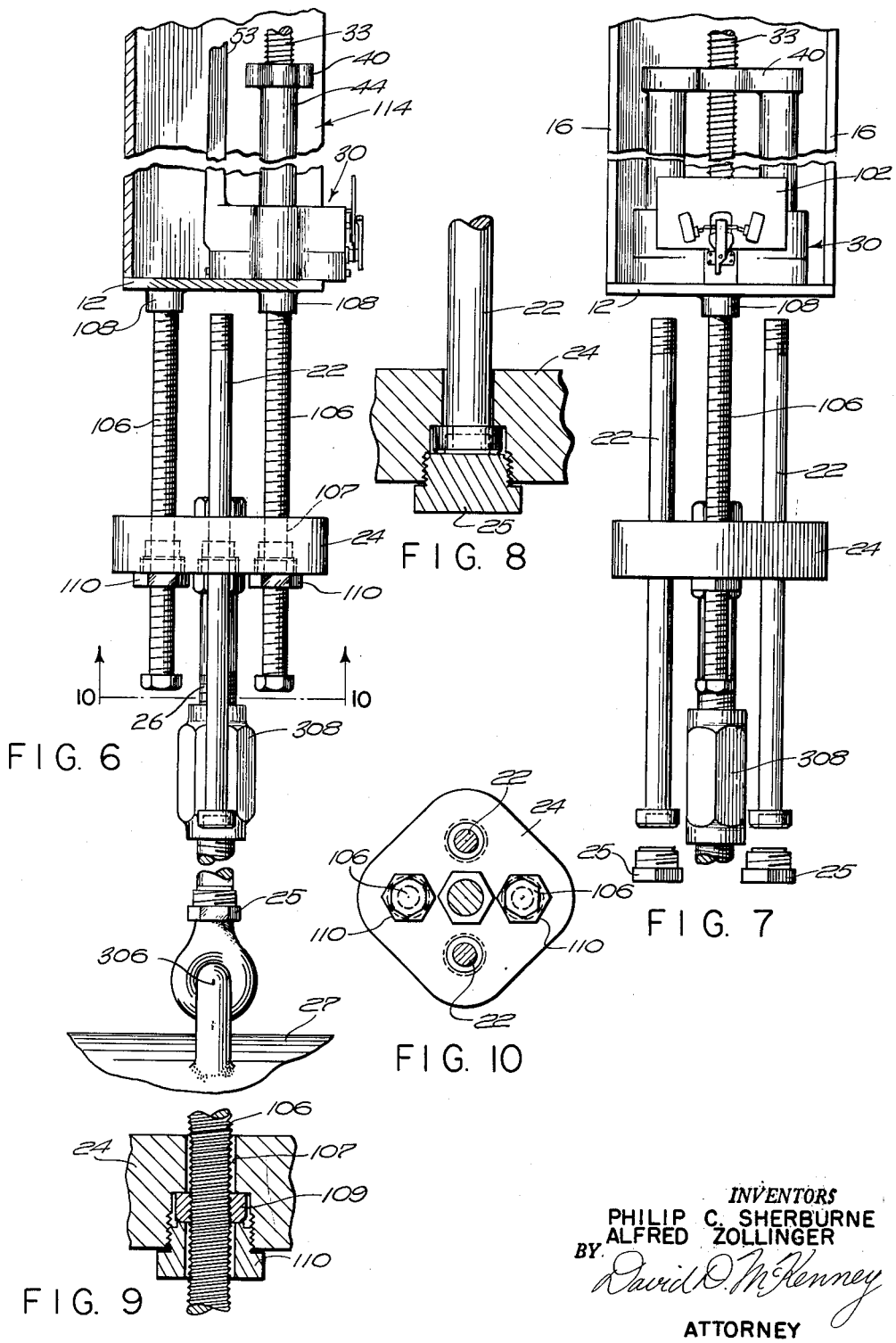

INVENTORS
PHILIP C. SHERBURNE
ALFRED ZOLLINGER
BY
ATTORNEY

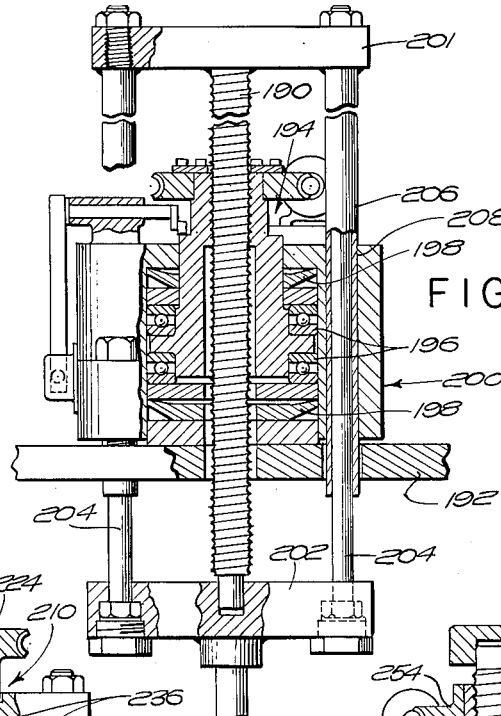
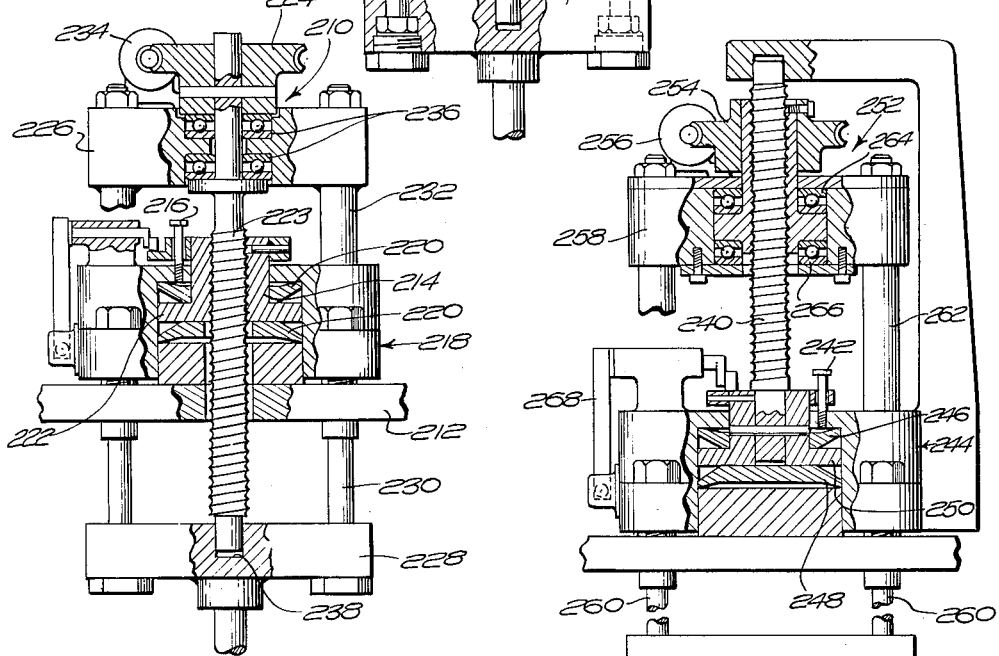
FIG. 13
FIG. 14
FIG. 15
INVENTORS
PHILIP C. SHERBURNE
ALFRED ZOLLINGER
BY David D. McKenney
ATTORNEY

United States Patent Office 2,975,996
Patented Mar. 21, 1961

2,975,996

MOTOR DRIVEN POSITIONER

Philip C. Sherburne, Rumford, and Alfred Zollinger, Providence, R.I., assignors to Grinnell Corporation, Providence, R.I., a corporation of Delaware Filed July 13, 1959, Ser. No. 826,760

17 Claims. (Cl. 248—58)

This invention relates to improvements in motor-driven devices for changing the position of equipment in a fluid handling system in accordance with changes in the temperature of such equipment.

Typical installations of fluid handling equipment with which devices of this invention may be used are the steam and hot water pipe lines and vessels in a plant generating electricity with steam. Such equipment expands and contracts with the temperature increases and decreases which occur during the warming-up of the equipment to operating temperature and the cooling-down of the equipment to room temperature, and because the equipment is mounted on fixed building structure and its components are not completely flexible, such expansion and contraction can result in the development of dangerous stresses at certain critical points in the system if these or other points are not moved to certain predetermined positions for each temperature change. These movements may be accomplished by motor driven equipment positioners like those of this invention and result in keeping the stresses at the critical points in the system at safe values.

One form of motor driven equipment positioner which has been heretofore proposed and over which the present invention is an improvement comprises a frame, an electric motor, a speed reducing gear unit, a jack mechanism and mountings on the frame for the motor, gear unit and jack mechanism. This jack mechanism has two principal components, a nut member and a screw member, one of which moves in a straight line with respect to the frame (and is herein referred to as the movable component) and the other of which does not move in a straight line with respect to the frame but normally rotates with respect to the frame (and is herein referred to as the stationary component). Rods or similar members connect the equipment to be positioned to the movable component and guides on the frame prevent this movable component from rotating with respect to said frame.

One of the difficulties with this form of device has to do with the provision of these guides. Thus prior to this invention it has been proposed to provide these guides on the side plates of the frame and to try to arrange them so that they extend parallel to the path of movement of the movable component and engage this component as it moves. The difficulty arises from the fact that if the guides are not parallel to this path of movement the jack mechanism jams, and the most exact workmanship is required to locate the guides on the side plates so that they are thus parallel. The large number of parts which determine the relative positions of the guides and of the movable component have in large part accounted for this difficulty in achieving the necessary parallel relationship.

One object of the present invention is to overcome this difficulty by locating the guides directly on the same unit which is provided for mounting the jack mechanism components on the frame and which determines the direction of the path of movement, this unit being arranged so that its surfaces which do the guiding can be machined with direct reference to its surfaces which determine the direction in which the stationary component extends (and hence the direction in which the movable component moves).

Another difficulty with the earlier proposed motor-driven fluid handling equipment positioners is that when the speed reducing gear unit, jack mechanism and mounting units are removed from the frame as a sub-assembly—which facilitates repair work on one of these parts—the orientation of the movable and stationary jack mechanism components with respect to each other is upset. Thus, in the proposed devices the guides for the movable jack mechanism component remain on the side plates of the frame when the jack mechanism is removed, and accordingly this movable component is not thereafter prevented from rotation with respect to the mounting unit. After the defective part has been repaired it is likely that the orientation of the movable component with respect to the mounting unit will have changed and require resetting and holding before the jack mechanism can be reinstalled.

Another object of the present invention is to overcome this difficulty by having elongated orientation members secured to either the movable jack mechanism component or to the mounting unit and by having them extend into sliding engagement with guides on the other so as to maintain the alignment of this component and unit even when rods connecting the movable component to the load are removed. In one embodiment of this invention the elongated members are in the form of sleeves which are connected to the movable component, which slide in apertures in the mounting unit and which slidingly embrace load supporting tension rods connecting the load to the movable component. By this arrangement the elongated members and guides oppose all the lateral forces arising during operation from the friction between the jack mechanism components, so that none of these forces are imposed on the load supporting rods, and these rods do not have to be made strong enough to withstand these lateral forces as well as the tension or compression forces.

Another difficulty with prior motor driven positioning devices has been a failure to provide for exerting force on the equipment in opposite direction with a single device, each prior device being limited to exerting force in one direction only. Where these devices have been proposed as constant support hangers it has been necessary to exert force only in one direction, but where they are to be employed to position the equipment in accordance with a predetermined program correlated to temperature changes and without regard to the equipment weight, it can frequently happen that a point on the equipment must be forcibly moved in one direction during one part of the program cycle and in the opposite direction during another part of this cycle. A pair of single direction units arranged to oppose each other is unsatisfactory because of the control problem which arises from the fact that when one unit is working the other must be operated so as to keep in step with but not interfere with the working unit.

Another object of the present invention is to arrange the jack mechanism so that force may thus be exerted in opposite directions by the device. Furthermore, in devices of this kind it is customary to have a load cell which detects changes in the force exerted by responding to slight movements of certain parts and which operates suitable motor switches when these movements reach predetermined magnitudes. Another object of the present invention is to provide a load cell which is employed in such a manner as to indicate the changes in force in either direction.

Since the force may be exerted in opposite directions in devices according to this invention the transition from one to the other involves reversal of the force exerted on certain of the parts, and because of the impossibility of avoiding some looseness in the fitting of the parts slight movements of such parts occur during this transition. These slight movements of such parts result in false readings of force change and improper motor switch operation. In accordance with another object of the present invention such slight movements are eliminated by spring loading the parts in the load cells together during assembly. In a preferred form this preloading is accomplished by precompressing the load cell springs.

Another difficulty with prior proposed motor-driven fluid handling equipment positioners is that one of the jack mechanism components is not properly supported for exerting force in opposite directions. Thus in devices of this kind one of the jack mechanism components has considerable length relative to its thickness, for example the screw member must be as long as the desired movement of the equipment but it is not practical to make it thick enough to withstand bending when stressed in compression and supported at only one end. Since this invention makes possible the exertion of force in opposite directions, the long component is stressed in compression during operation in one direction.

Another object is to overcome this difficulty by mounting both ends of the elongated component with respect to the frame so that buckling of this component and jamming of the jack mechanism are prevented. It is a feature of a preferred form of this invention that the ends of the elongated component are both carried on the same jack mechanism mounting unit so that proper alignment is facilitated.

Another disadvantage of prior motor-driven positioning devices is that they have not been reliably lubricated for prolonged maintenance-free service. It is therefore another object of the present invention to overcome this disadvantage by the provision of an oil bath in which the thrust bearings, load cells and portions of the load measuring equipment are completely immersed.

Other objects will appear hereafter.

The accompanying drawings show and the following specification describes preferred embodiments of the present invention.

In the accompanying drawings:

Figure 3 is a front elevation view of the portion shown in Figure 1;

Figure 4 is a view taken on line 4—4 of Figure 3;

Figure 5 is a view taken on line 5—5 of Figure 4;

Figure 6 is a side elevation view of the lower portion of a device like that of Fig. 1 and of the connection to the fluid handling equipment and shows the positions of the parts during replacement of certain components in the device after the device has been in service;

Figure 7 is a front elevation view of the parts shown in Fig. 6;

Figure 8 is a cross section view of the detail of Figs. 6 and 7;

Figure 9 is a cross section view of another detail of Figs. 6 and 7;

Figure 10 is a view taken on line 10—10 of Fig. 6;

Figure 1:
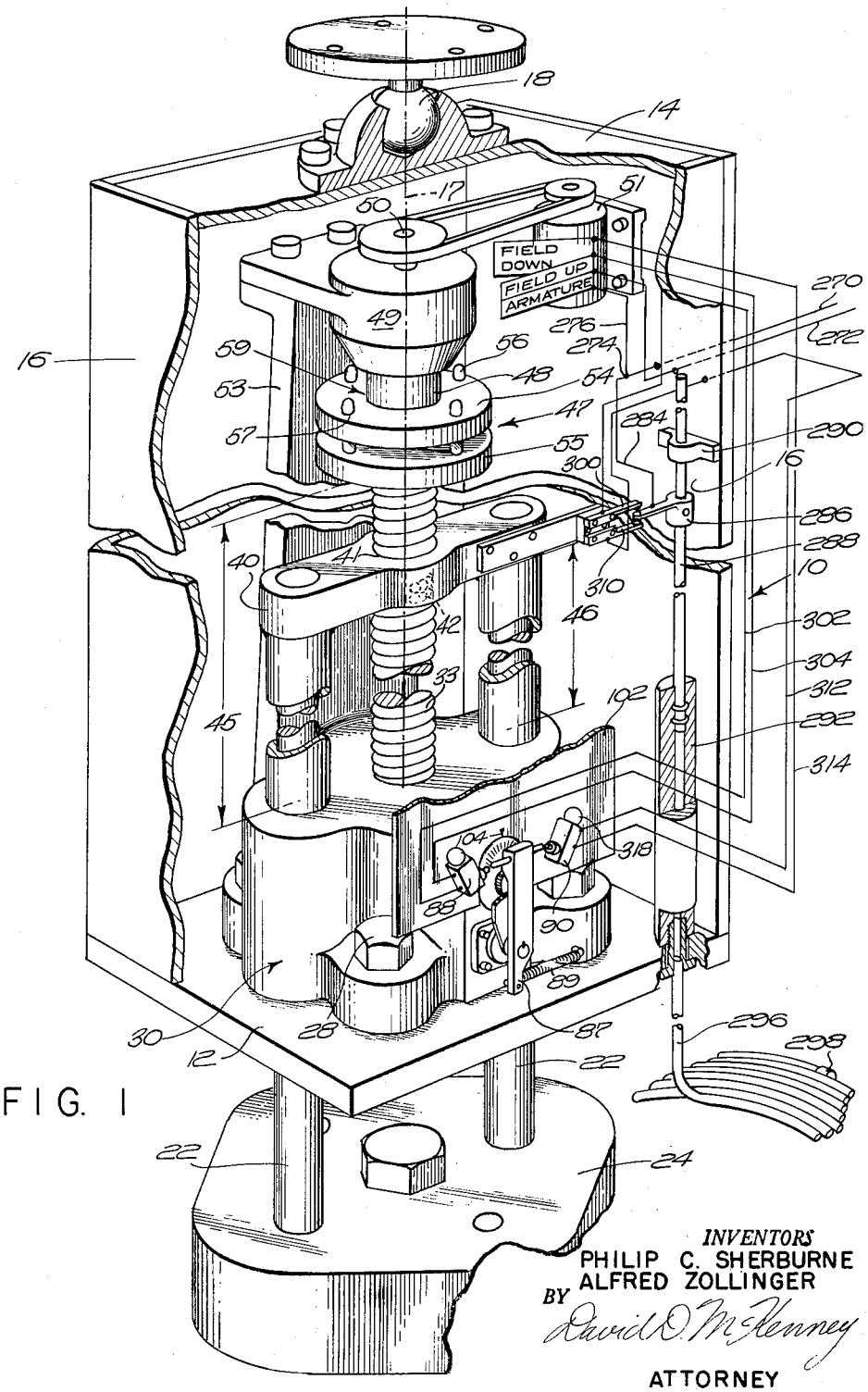
Figure 1 is a perspective view, partially cut-away, showing the embodiment of a motor-driven, fluid handling equipment positioner in accordance with the present invention.
Figure 12:
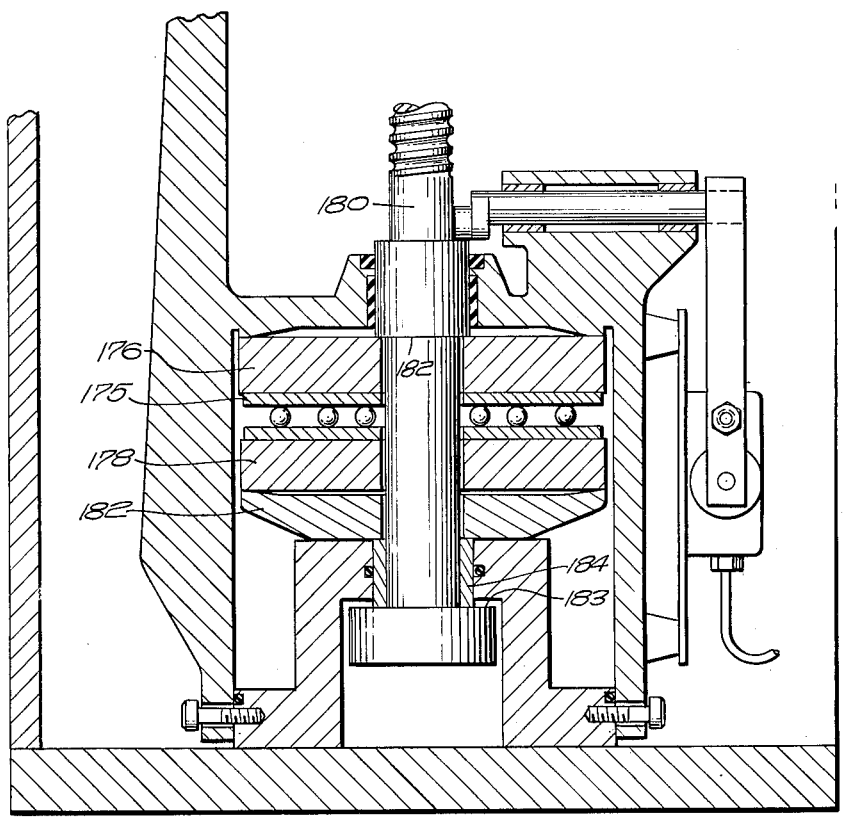

Figure 12 is a sectioned front elevation view of still another embodiment of the jack mechanism mounting unit; and Figures 13, 14 and 15 are views showing how the features of the invention may be embodied in devices in which the relative motions of the jack components with respect to the frame differ from Fig. 1. In Fig. 13 the nut is rotated and the screw moves linearly. In Fig. 14 the screw is rotated and moves linearly, and in Fig. 15 the nut is rotated and moves linearly.

Referring now to Fig. 1 of the drawings, this shows a motor-driven equipment positioner having a frame 10 including a base plate 12, top plate 14 and side plate 16. This frame is in the form of an elongated four-sided box which is disposed with its long axis 17 coincidental with the directions in which it is intended to exert force on the equipment. Thus the upper end plate is provided with a universal joint 18 to connect the frame to fixed building structure (not shown). Such a joint is employed because the directions of force exertion may change somewhat with changes in equipment temperature.

The base plate 12 is provided with two openings 19 through each of which extends a tension-compression load connecting rod 22. The corresponding ends of these rods exterior of the frame are rigidly connected to the ends of a cross bar 24 by plugs 25. A third rod 26 has one end rigidly connected to the center of this cross bar and the other end connected to a piece of fluid handling equipment (pipe 27) in the manner shown.

Resting on the upper surface of the plate 12 and secured thereto by four bolts 28 is a jack mechanism mounting unit 30 containing thrust bearings 31 and 32 for the lower end of an elongated rotatable threaded screw member 33, load cell springs 34 and 35 and load measuring equipment 36. In addition, the unit 30 is provided with two integral side portions 37 having passages 38 therethrough parallel to the screw member 33. These passages are aligned with the openings 19 in the base plate 12, so that the rods 22 extending through the passages 38 also extend through these openings. The corresponding ends of these rods 22 interior of the frame are threaded into the ends of a nut member 40 which has its center, apertured portion 41 threadedly mounted on the screw member 33. Preferably a ball type screw thread is employed, this being shown more or less diagrammatically with the balls indicated by the numeral 42. The upper end of each passage 38 forms a sliding guide 43 for a cylindrical sleeve 44 surrounding the rod 22 and having its upper end rigidly connected to the nut member 40. These guides 43 are located as near as possible to the range 45 of straight line movement of the nut member on the screw member (this range being the threaded portion of the screw member) so that the distance between the nut member and these guides is kept at a minimum. (See Fig. 1.) This keeps as small as possible the leverage 46 between the nut member 40 which tends to be rotated by friction on the screw member 33 and the guides 43 which prevent such rotation, and as a result the stresses in the sleeves 44 are kept at a minimum.

The rods 22 within the sleeves 44 are preferably not in contact with these sleeves so that no lateral forces are imposed on the load supporting members 22. The sleeves 44 are of sufficient length so that when the nut member 40 is at the upper end of its limited range 45 these sleeves are nevertheless still in contact with the guides 43.

Above the nut member 40, threaded screw member 33 has its upper end connected through a coupling 47 to the output shaft 48 of a speed reducing gear unit 49 which has its input shaft 50 driven in a conventional manner, for example, by a motor 51 through a belt and pulley assembly 52, the motor being mounted on one of the frame side plates 16.

Since the load cells 34 and 35 in the mounting unit 30 provide slight movements of the screw member with respect to the unit 30 with changes in the force exerted on the load, and since the speed reducing gear unit 49 has to be mounted so as not to rotate with respect to the frame, a portion 53 of the mounting unit 30 extends alongside the screw member to the speed reducing gear unit which is secured thereto. Accordingly, the coupling 47 comprises a pair of spaced apart and parallel discs 54 and 55, the first connected to the output shaft 48 of the reduction gear unit 49 and the second connected to the upper end of the screw member 32. Pins 56 parallel to the axis of the screw member have their lower ends secured in discs 55 and the upper ends slidably mounted in apertures 57 in the disc 54 so that the screw member 32 is rotated and at the same time able to move slightly with respect to the mounting unit in directions parallel to the screw member axis.

By this above-described construction, several advantages are obtained. First of all, the guides 43 for the sleeves 44 are located in the mounting unit 30 where they may be accurately machined with respect to the bearing surfaces which determine the direction in which the screw member extends. Location of guides on the frame side plates 16, as in prior proposed devices of this kind, has made proper alignment of the guides very difficult because the guides and jack mechanism mounting unit have been independently mounted on the frame. Even a very slight error in the proper orientation of the guides with respect to the screw member 33 can result in jamming of the jack mechanism and failure of the unit to operate.

Another advantage of this construction is that when the load supporting rods 22 are removed during repair of the hanger the orientation of the nut member 40 with respect to the mounting unit 30 which existed just before removal is maintained because the sleeves 44 remain connected to the nut member 40 and are engaged in the guides 43 in all positions of the nut member.

Another advantage of this construction is that the sleeves 44 alone prevent rotation of the nut member, and no lateral force is imposed upon the load supporting rods 22 within these sleeves.

Another advantage of the described construction is that the guides on the mounting unit are located as near as possible to the range of movement 45 of the nut member 40. This keeps to a minimum the distance 46 between the nut member, which friction in the jack mechanism is tending to rotate, and the guides 43, which are preventing this rotation. The shorter this distance 46 the less the stress in the sleeves 40.

Still another advantage of this construction is that both ends of the elongated screw member 33 are supported. In this embodiment a journal bearing 58 is provided in the mounting unit 30 for the lower end of this screw member, and another journal bearing 59 is provided at the upper end of this screw member in the speed reducing gear unit 49 which is in turn secured to the extension 53 on the mounting unit 30. This support of the elongated screw member at both ends prevents buckling of the screw member and consequent cramping of the jack mechanism when screw member is loaded in compression.

Still another advantage of this construction is that when it is necessary to repair the hanger, the speed reducing gear unit, jack mechanism and mounting unit can be quickly removed as a sub-assembly by temporarily securing the load directly to the frame 10 and then removing the rods 22. This is a great advantage because rapid replacement of the entire-sub-assembly when one part thereof fails restores the device to operation in the shortest possible time.

Figure 2:
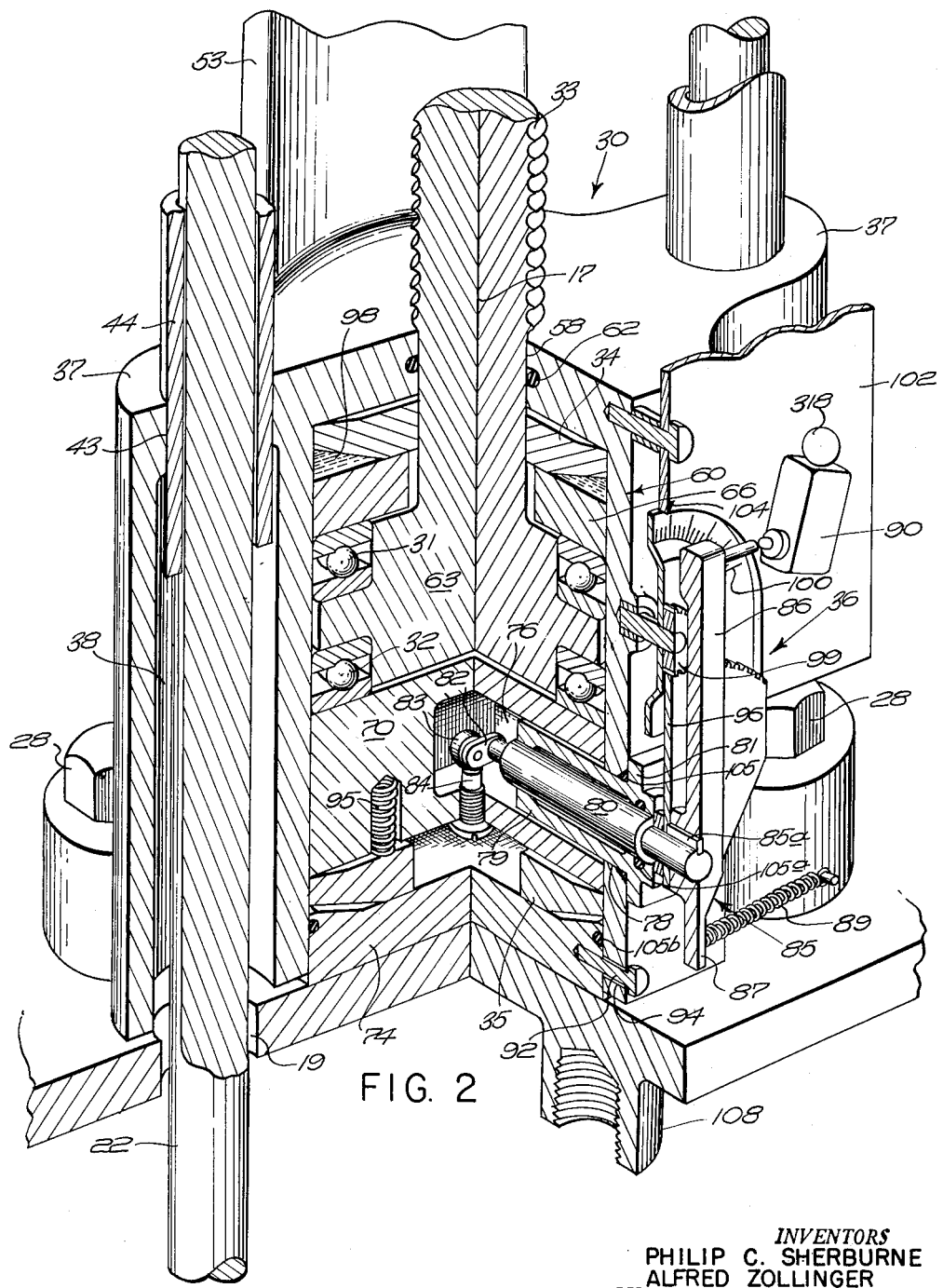
Figure 2 is an enlarged fragmentary perspective view of a portion of the device of Figure 1 showing, in greater detail, the thrust bearings, load cells, load indicating mechanism and motor switching mechanism at the lower end of the device.

Referring now to Fig. 2, this illustrates in more detail the mechanism in the mounting unit 30. Thus, the lower end of the screw member 33 enters the housing 60 of this unit through the bearing 58 having a fluid seal 62 and is provided with an enlarged end 63 and flange 64. Annular thrust bearings 31 and 32 are located around the screw member above and below this flange. Thrust bearing 31 engages a thick washer 66 which in turn engages the Belleville spring 34 which in turn engages the upper end 68 of the housing 60. Thrust bearing 32 engages a cylindrical block 70 which in turn engages a second Belleville spring 35 which in turn engages a base plate 74 provided across the bottom of the housing 60. An offset passageway 76 extends in from one side of this cylindrical block 70 to a point beyond the common axis 17 of the screw member, thrust bearings, washer and springs.

Extending into this passageway through an opening 78 in the side of the housing 60 is a bearing sleeve 79 for a shaft 80. This sleeve has a flange 81 which is secured to the exterior surface of the housing 60 and extends along the passageway 76 to a point short of, and to one side of, the common axis 17. The shaft 80 turns freely in the sleeve 79 and is provided at its inner end with a small lever 82 rigidly connected to the shaft, extending to the axis 17 and carrying at that point a roller 83 which rests upon the end of a bolt 84 threaded into the bottom of the block 70 along the axis 17.

With this arrangement relative movement of the block 70 with respect to the housing 60 caused by deflection of one of the Belleville springs, results in rotation of the lever 82 which turns the shaft 80 about its axis. The outer end of this shaft has rigidly connected thereto by a key 85a another lever 85 having a long arm 86 adapted to operate a pair of switches 88 and 90 and a short arm 87 (Fig. 1) connected to one end of a tension spring 88. The other end of this spring is connected to a point on the housing 60. The spring 88 urges the shaft 80 to rotate in a counter clockwise direction (as seen in Fig. 2) and thus keeps the roller 83 firmly in contact with bolt 84 at all times. The switches 88 and 90 (Figs. 1 and 2) are employed to control the motor 51, so that if the deflection of the Belleville springs 34 or 35 results in the closing of one of these switches (indicating that a dangerously large force is being exerted) the motor will be turned off.

Also rigidly connected to the outer end of the shaft 80 by the same key 85a is a second lever 96 which is in the form of a segment gear meshed with a gear 99 rotatably mounted on the housing 60 and carrying a scale 100, so that the amount of force change represented by movement of the springs is indicated by rotation of this scale 100. A plate 102 fastened to the housing 60 and providing a mounting for the switches 88 and 90 is provided with a mark 104 adjacent the scale 100 and serving as a reference point for movement thereof.

One advantage illustrated by this construction of Fig. 2 is that the device may exert force on the equipment in opposite directions. This is accomplished by the two thrust bearings 31 and 32 permitting free rotation under load exerted by the screw member either upwardly (in Fig. 2) or downwardly.

It is another advantage of this construction that the load cell springs 34 and 35 will detect a change in the amount of force exerted in either direction. This is accomplished by maintaining the roller 83 in firm contact with the bolt 84 at all times so that when the block 70 moves upward or downward relative to the stationary housing 60 the shaft 80 is rotated accordingly.

Still another advantage is that the springs 34 and 35 are preloaded slightly so that there is no looseness between the parts when no force is being exerted on the equipment. In manufacturing the parts there are unavoidable manufacturing tolerances, and when there is no preloading of the springs looseness between the parts is present in the no-load condition which interferes with the proper actuation of the switches and the accuracy of the scale reading. Preloading is accomplished by having the base plate 74 slidable in the lower end of the housing 60 through a range of movement. In the drawings this range is limited by a series of bolts 92 passing through slots 94 in the lower end of the housing and threaded into the base plate 74. When the housing is rested on the frame, as in Fig. 1, and the bolts 28 are turned to secure the housing to the frame, the springs 34 and 35 are deflected slightly by movement of the housing with respect to the base plate. The amount of this preloading is adjustable within the limits of the slots 94. In addition to this preloading of the springs 34 and 35, Fig. 2 illustrates that supplemental springs 95 may be employed between the Belleville spring 35 and the block 70 to cause the block 70 to follow movements of the screw member when spring 34 is compressed and spring 35 relaxed.

The housing 60 and base plate 74 form a container which in addition to the springs, bearings, etc., is filled with oil 98 to lubricate the parts. Such an oil bath, as distinguished from usual lubrication methods, provides more reliable oiling over prolonged periods. Suitable seals 62, 105, 105a and 105b prevent leakage of the oil from the container apertures.

Figs. 6 and 7 illustrate the positions of parts of the Fig. 1 device during replacement of certain components after the device has been in service. Thus, if a part becomes defective and requires replacement, for example, if the nut member 40 breaks and becomes jammed on the screw member 33, it is necessary to replace this nut member. Such a breakage would normally be detected by observation that the motor 51 was drawing excessive current in an effort to overcome the friction developed by the jammed parts. Rapid replacement would be necessary if at the time of the breakage the device was operating to change the position of a power plant steam line which was in the process of being warmed up or cooled down. The present construction permits such rapid replacement because the principal parts (including the nut member) may be removed as a sub-assembly in a very short time and replaced by another sub-assembly. The first step in such a replacement involves temporarily converting the hanger to a rigid construction between the fluid handling equipment and building structure by installation of temporary rods 106 shown in Fig. 6. These rods are passed up through apertures 107 in the cross bar 24 and threaded into bosses 108 in the bottom frame plate 12. Nuts 109 adjustably located on the rods 106 and are themselves secured to the cross bar 24 by apertured plugs 110, temporarily rigidly securing the cross bar 24 to the frame at any position of the nut member 40 within its range of movement. Once these temporary rods 106 are in place the plugs 25 are removed from the cross bar 24 to release tension rods 22 which may then be unscrewed from the nut member 40 and drawn down through the sleeves 44, frame bottom plate 12 and cross bar 24. Next the bolts 28 which secure the mounting unit 30 to the frame bottom plate 12 are removed and the belt drive between the motor 51 and speed reducing gear unit 49 is disconnected. It is then possible to remove the sub-assembly (jack mechanism and speed reducing gear unit) through a side opening 114 in the frame. A new sub-assembly can be immediately inserted, and the device operating before the warming up (or cooling down) equipment has developed unsafe stresses due to the inability of the failed device to move the equipment in accordance with the temperature changes.

Figure 11:
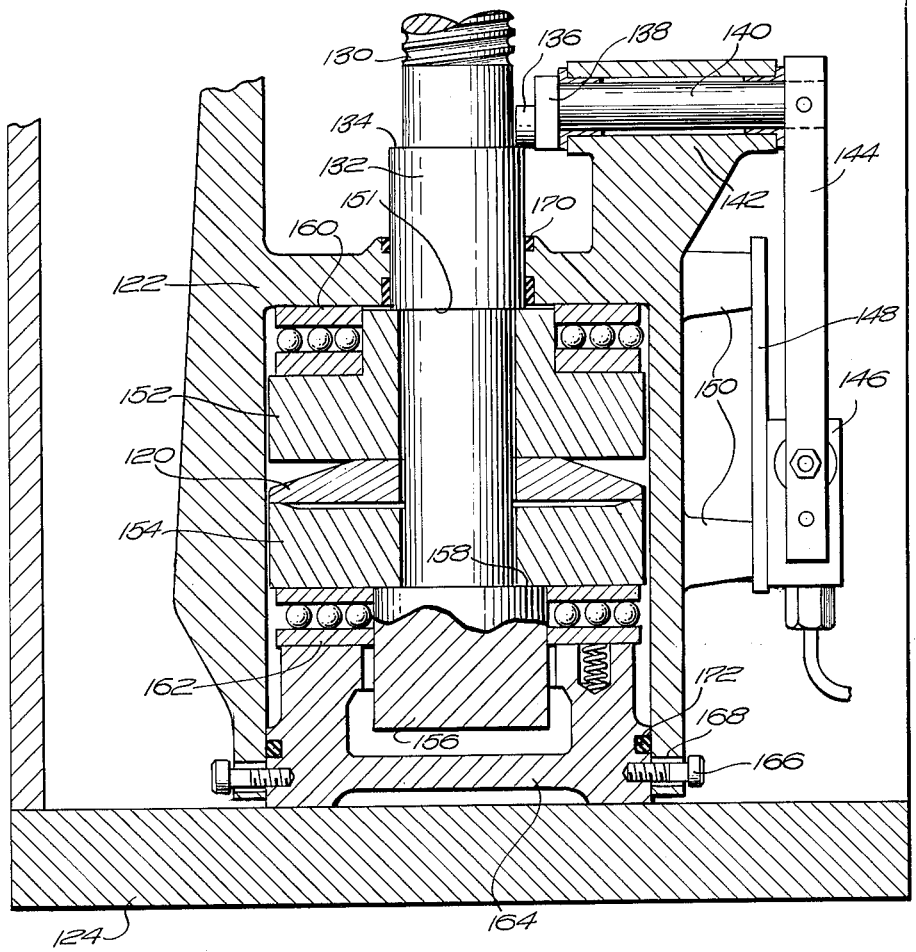
Figure 11 is a sectioned front elevation view of another embodiment of the jack mechanism mounting unit.

Fig. 11 shows another embodiment of a jack mechanism mounting unit which is like that of the previous figures except that only one load cell spring 120 is employed and the motion of the parts caused by deflection of this spring is detected outside of the mounting unit. More particularly this unit comprises a housing 122 fastened to a frame base plate 124. The lower end of a screw member 130 is enlarged at 132 where it passes into the housing to form a shoulder 134 against which rests a roller 136 corresponding to the roller 83 of Fig. 2. This roller is mounted on the end of a short lever arm 138 which is in turn rigidly fixed to the end of a shaft 140 rotatably mounted in a bracket 142 on the housing 122 and having another lever arm 144 rigidly secured to its other end. This latter lever arm engages and actuates a pair of switches one of which (146) is shown. These switches are mounted on a plate 148 which is in turn secured to extending pieces 150 on the exterior surface of the housing 122.

Inside of the housing the lower end of the screw member has a shoulder 151 engaging the upper surface of an annular block 152, then passes slidably through this block, through the spring 120, through another annular block 154 and is enlarged at 156 to form a shoulder 158 which engages the undersurface of the block 154. A thrust bearing 160 is interposed between the block 152 and the upper inner end of the housing, and another thrust bearing 162 is interposed between the block 154 and a base plate 164 which rests on the frame base plate 124. This base plate 164 is loosely secured to the housing 122 at the lower end thereof by bolts 166 which pass through elongated slots 168 in the housing and are threaded into the plate 164. By this arrangement an initial preloading may be provided in the spring 120 by adjustment of the bolts which secure the housing to the frame in the same manner as described with previous figures. Oil seals 170 and 172 enable the inside of the housing to be completely filled with oil.

This embodiment enables the single spring 120 to register both changes in load exerted downwardly by the screw member and changes in load exerted upwardly by this member. Thus if the load is downward and increases the shoulder 151 on the screw member engages the block 152 which deflects the spring 120 and the bearing 162 permits the rotary motion of the screw member. On the other hand if the load is upward the shoulder 158 engages the block 154 deflecting the spring 120 and the bearing 160 permits the rotary motion of the screw member.

Figure 12 in an embodiment like Fig. 11 except that only one thrust bearing and one spring are employed, the thrust bearing 175 being between two annular blocks 176 and 178. Thus, if the load is downwardly on the screw member 180 a shoulder 182 thereon engages block 176 and rotates it with respect to block 178 because of the intervening bearing 175. Changes in load are reflected by changes in the deflection of spring 182. Similarly if the load is upwardly on the screw member 180 a shoulder 183 thereon engages a member 184 which engages the spring 182, so that the member 184, spring 182 and block 178 are rotated and the block 176 remains stationary. In other respects the structure shown in Fig. 12 is similar to that of Fig. 11.

Fig. 13 illustrates that the relative movements of the jack mechanism components with respect to the frame may be changed within the scope of this invention. For example, with the screw and nut type of jack mechanism shown in Fig. 13 the screw 190 may be held against rotation but permitted to move linearly with respect to the frame 192. Then if the nut 194 is rotated and held against linear movement with respect to the frame the screw moves linearly. In this embodiment the equipment (not shown) is connected to the upper end of the screw 190. Thrust bearings 196 and springs 198 are located in a unit 200 which mounts the nut 194 on the frame. The guiding arrangement, spring precompression and lubrication are like those of the earlier figures.

Since the screw moves linearly in this embodiment its ends are supported to prevent its buckling when loaded in compression by cross bars 201 and 202 joined together by rods 204 which have sleeves 206 guided in apertures 208 in the mounting unit. Thus in this embodiment the rods 204 serve the double function of preventing buckling of the screw and also guiding the path of linear movement of the screw directly on the same mounting unit which determines the direction of that path.

Figure 14 illustrates another combination of relative movements of the jack components with respect to the frame. In this embodiment a screw assembly 210 is rotated and free to move linearly with respect to the frame 212. On the other hand the nut 214 is held against rotation by a guiding bolt 216 on a mounting unit 218 and is held against linear movement (except for slight movement due to changes in deflection of springs 220) by a flange portion 222 confined between the springs within the mounting unit. Unlike the Figs. 1 and 13 embodiments the linearly movable screw assembly in Fig. 14 has a portion which rotates and a portion which is held against rotation. The former portion includes the screw 223 itself and a worm wheel 224 secured thereto, while the latter includes cross bars 226 and 228, connecting rods 230 and sleeves 232. A motor 234 for driving the worm gear 224 is carried on the cross bar 226. Because of the rotation of the first screw assembly portion with respect to the second screw assembly portion thrust bearings 236 are provided at the cross bar 226 for the upper end of the screw 223 and a supporting aperture 238 is provided in the cross bar 228 for the lower end of the screw.

Figure 15 illustrates still another combination of possible relative movements of the jack components with respect to the frame. In this embodiment the screw 240 is held against rotation by a guiding bolt 242 carried on a mounting unit 244 and is held against linear movement by the mounting unit which encloses between a pair of springs 246 and 248 a flange 250 carried on the lower end of the screw 240. These springs permit only very slight linear movements of the screw. A nut assembly 252 is threaded on the screw and has a first rotating portion 254 driven by a motor 256 mounted on a second non-rotating portion 258 to which the load is connected by rods 260 and which is guided on the mounting unit by sleeves 262 as in the earlier figures. Thrust bearings 264 and 266 are interposed between the first and second portions of the nut assembly. A switch mechanism 268 detects the spring deflections and controls the motor when these deflections become larger than a predetermined amount.

A representative control circuit for devices in accordance with this invention is shown in Fig. 1. Direct current electricity for the reversible motor 51 is brought to the device over conductor 270 and returned to the source by a conductor 272. At a junction 274 electricity is led from conductor 270 through conductor 276 to the armature of the motor and back along conductor 272. The motor is provided with field windings, which when energized, cause the motor to turn in that direction which moves the load up, and is also provided with additional field windings which, when energized, cause the motor to move the load down.

From junction point 274 electricity is also lead along a conductor 284 to a switch member 286 carried on a piston rod 288 which has its upper end guided in a bracket 290 on the frame and has its lower end closely fitted in an oil filled cylinder 292 also on the frame. This cylinder communicates at its lower end with an oil-filled tube 296 which is wrapped around the pipe and has its end 298 closed.

The volume of oil in the tube is great enough and the size of the cylinder 292 small enough so that the expansion and contraction of the oil with changes in its temperature moves the piston 288 up or down as the case may be. When switch member 286 contacts a switch member 300 carried on the nut member 40 this completes a circuit comprising conductor 270, conductor 284, switch member 286, switch member 300, a conductor 302 to switch 88 which is normally closed, a conductor 304 to the up motor field windings and conductor 272 back to the source. This turns on the motor to move the load up, and because the device is designed to move the load at a faster rate than that of the switch member 286, the switch member carried on the nut member 40 moves out of contact with the switch member 286 and turns the motor off. This stops the nut member 40, but if the oil 294 is still expanding because the temperature of the pipe is still increasing the switch member continues to move and again makes contact with the switch member 300, again turning on the motor to move the load up.

Thus an intermittent operation takes place with the load being kept in step with the movements of the piston 288. The design of the piston-cylinder unit 288—292 is in accordance with calculations as to where the load should be positioned for each temperature to keep the stresses low at certain critical points in the piping system. For example, assume in the case of Fig. 1 that at room temperature the point 306 on the pipe 27 where the device is connected (see Fig. 6) should be in that position in space which requires that the device exert a downward push on the pipe. This would be similar to the "cold pull" technique some times employed in erecting such pipe lines. Such a push could be accomplished during initial installation (when the system is at room temperature) by adjusting a turnbuckle 308 shown in Fig. 6.

During the warm-up of the pipe system the upward movement of the nut member 40 in step with the switch member 286 would reduce the push until at some intermediate point in the total movement of the switch member 286 the device would be exerting no force on the pipe and would thereafter begin to exert a pull on the pipe as the upward movement of switch member 286 continues.

The operation of the device during downward movement of the piston 288 is the reverse of that above described. In that case the switch member 286 engages another switch member 310 mounted on the nut member 40 which completes a circuit through a conductor 312, switch 90 which is normally closed, conductor 314, down field windings of the motor 51 and conductor 272. This circuit turns on the motor to move the nut member down, and again there is intermittent motor operation causing the nut member to keep in step with the moving piston.

The switches 88 and 90 are overload switches in the motor circuit to turn off the motor if the force exerted on the pipe exceeds a predetermined value. Thus for example if at the end of a cool-down period oil begins to leak from the cylinder 292 so that the piston 288 does not follow its prearranged schedule of movement with temperature the device could begin to exert too great a push on the pipe at each temperature. This would deflect spring 34 more than expected, causing block 70 to move upward and to rotate shaft 80 and lever arm 86 clockwise (in Fig. 2). When this deflection reaches a predetermined amount which represents the maximum push the pipe can safely tolerate switch 90 is set to open stopping the motor and signalling through a light 318 that an overload condition exists. Since the switch members 286 and 300 would remain in contact through the remainder of the cool-down period (because of the oil leak) the operation of the device would be governed by the switch 90 which would turn the motor on and off so as to maintain the push on the pipe at the maximum tolerable level for which switch 90 was set.

Either switch 88 or 90 might also operate if in the initial calculation of the path to be followed by the load there is uncertainty as to the forces which may result and it is desired in any event to hold these forces below certain predetermined values. In such a case the movement of the piston 288 would be as intended and the nut would remain in step with this piston movement, but if in so moving the device began to impose an excessive force on the pipe one of the switches 88 or 90 would prevent further operation. In practice, of course, it would be unlikely that the properly planned path of movement would result in such excessive forces, but switches 88 and 90 guard against unforeseen factors in planning such a path.

In the foregoing descriptions of the embodiments shown in the drawings each of the various jack mechanisms has been referred to as comprising a screw member and a nut member. As was stated earlier herein, these are preferred embodiments, and other types of jacks will occur to those skilled in this art. In all such jacks, however, there will be a pair of components one movable linearly with respect to the other which is linearly immovable. (In the case of the screw member-nut member jacks shown the movable component could be either member and the immovable component the other as the different embodiments show.) Accordingly, in the appended claims the jacks are set forth as having such components.

We claim:

1. A motor-driven device for positioning fluid handling equipment in accordance with changes in the temperature of said equipment, said device comprising a frame, a jack mechanism having a pair of components one of which is movable linearly with respect to the other and with respect to said frame and the said other of which is linearly immovable with respect to said frame, a motor, means connecting said motor to one of said components for moving said one component to produce relative movement between said components, a unit mounting said linearly immovable component on said frame, said unit having first guide parts, means connected to a portion of said linearly movable component for connecting said equipment thereto, said component portion having second guide parts engaging said first guide parts, whereby said linearly movable component is guided directly on said mounting unit.

2. A motor-driven device for positioning fluid handling equipment in accordance with changes in the temperature of said equipment, said device comprising a frame, a jack mechanism having a pair of components one of which is movable linearly with respect to said frame and the other of which is linearly immovable with respect to said frame, a motor, means connecting said motor to one of said components for rotating said component with respect to the other component and with respect to said frame, a unit mounting said linearly immovable component on said frame, said unit having first guide parts, means connected to a portion of said linearly movable component for connecting said equipment thereto, said component portion having second guide parts engaging said first guide parts, whereby said linearly movable component is guided directly on said mounting unit.

3. A motor-driven device for positioning fluid handling equipment in accordance with changes in the temperature of said equipment, said device comprising a frame, a jack mechanism having a screw component and a nut component threaded thereon one of said components being movable linearly with respect to the other and with respect to said frame and the other of said components being linearly immovable with respect to said frame, a motor, means connecting said motor to one of said components for rotating that component with respect to the frame, a unit mounting said linearly immovable component on said frame, said unit having first guide parts, means connected to a portion of said linearly movable component for connecting said equipment thereto, said component portion having second guide parts engaging said first guide parts, whereby said linearly movable component is guided directly on said mounting unit.

4. A motor-driven device for moving fluid handling equipment in one direction in accordance with changes in the temperature of said equipment, said device comprising a frame, a jack mechanism having a screw component with a longitudinal axis and having a nut component threaded on said screw component, a unit mounting one of said components on said frame and holding said component against linear movement with respect to said frame, means secured to a portion of said other component for connecting said equipment thereto, means for connecting said frame to fixed structure so that said axis extends in said direction, said mounting unit having guiding parts, said component portion having guided parts engaging said guiding parts and restricted thereby to linear movement parallel to said axis, a motor, means connecting said motor to one of said components for rotating at least a portion of that component portion with respect to said frame, whereby rotation of said component portion moves the component to which said connecting means are secured linearly with respect to said frame parallel to said axis, and whereby said linearly movable component is guided in said movement directly on said mounting unit.

5. A motor-driven device for moving fluid handling equipment in one direction in accordance with changes in the temperature of said equipment, said device comprising a frame, a jack mechanism having a screw component with a longitudinal axis and having a nut component threaded on said screw component, a unit mounting said screw component on said frame and holding said screw component against linear movement with respect to said frame, means secured to said nut component for connecting said equipment thereto, means for connecting said frame to fixed structure so that said axis extends in said direction, said mounting unit having guiding parts, said nut component having guided parts engaging said guiding parts and restricting said nut component to linear movement parallel to said axis, a motor, means for connecting said motor to said screw component for rotating said screw component with respect to said frame, whereby rotation of said screw component moves said nut component linearly with respect to said frame along said screw component, and whereby said linearly movable nut component is guided in said movement directly on said mounting unit.

6. A motor-driven device for moving fluid handling equipment in one direction in accordance with changes in the temperature of said equipment, said device comprising a frame, a jack mechanism having a screw component with a longitudinal axis and having a nut component threaded on said screw component, a unit mounting said nut component on said frame and holding said nut component against linear movement with respect to said frame, means secured to said screw component for connecting said equipment thereto, means for connecting said frame to fixed structure so that said axis extends in said direction, said mounting unit having guiding parts, said screw component having guided parts engaging said guiding parts and restricting said screw component to linear movement parallel to said axis, a motor, means for connecting said motor to said nut component for rotating said nut component with respect to said frame, whereby rotation of said nut component moves said screw component linearly with respect to said frame through said nut component, and whereby said linearly movable screw component is guided in said movement directly on said mounting unit.

7. A motor-driven device for moving fluid handling equipment in one direction in accordance with changes in the temperature of said equipment, said device comprising a frame, a jack mechanism having a screw component with a longitudinal axis and having a nut component threaded on said screw component, a unit mounting said screw component on said frame and holding said screw component against linear and rotational movement with respect to said frame, means secured to a first portion of said nut component for connecting said equipment thereto, means for connecting said frame to fixed structure so that said axis extends in said direction, said mounting unit having guiding parts, said nut component having guided parts on said first portion engaging said guiding parts and restricting said first nut component portion to linear movement parallel to said axis, a motor, means for connecting said motor to a second portion of said nut component for rotating said second portion with respect to said first portion and said frame, whereby rotation of said second nut component portion moves said nut component linearly with respect to said frame along said screw component, and whereby said linearly movable nut component is guided in said linear movement directly on said mounting unit.

8. A motor-driven device for moving fluid handling equipment in one direction in accordance with changes in the temperature of said equipment, said device comprising a frame, a jack mechanism having a screw component with a longitudinal axis and having a nut component threaded on said screw component, a unit mounting said nut component on said frame and holding said nut component against linear and rotational movement with respect to said frame, means secured to a first portion of said screw component for connecting said equipment thereto, means for connecting said frame to fixed structure so that said axis extends in said direction, said mounting unit having guiding parts, said screw component having guided parts on said first portion engaging said guiding parts and restricting said first screw component portion to linear movement parallel to said axis, a motor, means for connecting said motor to a second portion of said screw component for rotating said second portion with respect to said first portion and said frame, whereby rotation of said second screw component portion moves said screw component linearly with respect to said frame through said nut component, and whereby said linearly movable screw component is guided in said linear movement directly on said mounting unit.

9. The device of claim 1 also having means for limiting the linear movement of said linearly movable component to a range in which said second guide parts remain in engagement with said first guide parts.

10. The device of claim 1 in which said means connected to a portion of said linearly movable component for connecting said equipment thereto comprise an elongated rod, in which one of said guide parts comprises a sleeve surrounding said rod, and in which the other of said guide parts comprises a member embracing the exterior surface of said sleeve.

11. The device of claim 2 in which said rotated component is said linearly immovable component and has a bearing portion at said mounting unit with a pair of bearing surfaces facing in opposite directions along the path of said linear movement, in which there is a bearing surface on said mounting unit presented toward each component portion bearing surface, and in which there is a thrust bearing between each component bearing surface and the mounting unit bearing surface presented thereto.

12. The device of claim 2 in which said motor has a rotating output shaft, in which said means connecting said motor to one of said components comprises means for connecting said component to said motor output shaft, in which said rotated component is said linearly immovable component and has a bearing portion at said mounting unit with a pair of parallel bearing surfaces thereon perpendicular to the path of said linear movement and presented in opposite directions therealong, in which said mounting unit has a bearing surface parallel to and presented toward each component bearing surface to form a pair of said surfaces, and in which a thrust bearing unit is located between each said pair of bearing surfaces.

13. The device of claim 2 in which said means connecting said motor to one of said components comprises means for rotating a first portion of said component with respect to a second portion of said component and with respect to said frame, in which said component having said portions is said linearly movable component, in which each of said portions has a pair of bearing surfaces facing in opposite directions along the path of said linear movement, in which each bearing surface on said first portion has presented thereto a bearing surface on said second portion, and in which there are thrust bearings between each first portion bearing surface and the second portion bearing surface presented thereto.

14. The device of claim 2 in which said linearly immovable component has a mounting portion as said mounting unit with a pair of surfaces facing in opposite directions along the path of said linear movement, in which there is a surface on said mounting unit presented toward each component mounting portion surface, and in which there is a spring between each component mounting portion surface and the mounting unit surface presented thereto, said spring being deflected when the device is exerting zero force on said equipment.

15. The device of claim 3 in which said screw component is said linearly immovable component, in which said unit mounting said screw component engages one end thereof, in which said screw component is stressed in compression when said means connected to a portion of said linearly movable component is connected to said equipment, and in which the other end of said screw component is supported on the frame at both ends and therefore prevented from buckling when stressed in compression.

16. The device of claim 15 in which the said other end of said screw component is also mounted on said mounting unit.

17. The device of claim 11 in which said mounting unit comprises a fluid tight housing, in which said linearly immovable component bearing portion, said mounting unit bearing surfaces and said thrust bearings are within said housing, and in which said housing is substantially filled with a lubricating fluid.

References Cited in the file of this patent

UNITED STATES PATENTS

| | | |
|---|---|---|
| 2,248,730 | Wood | July 8, 1941 |
| 2,675,977 | Berlichingen | Apr. 20, 1954 |